Patented Nov. 19, 1946

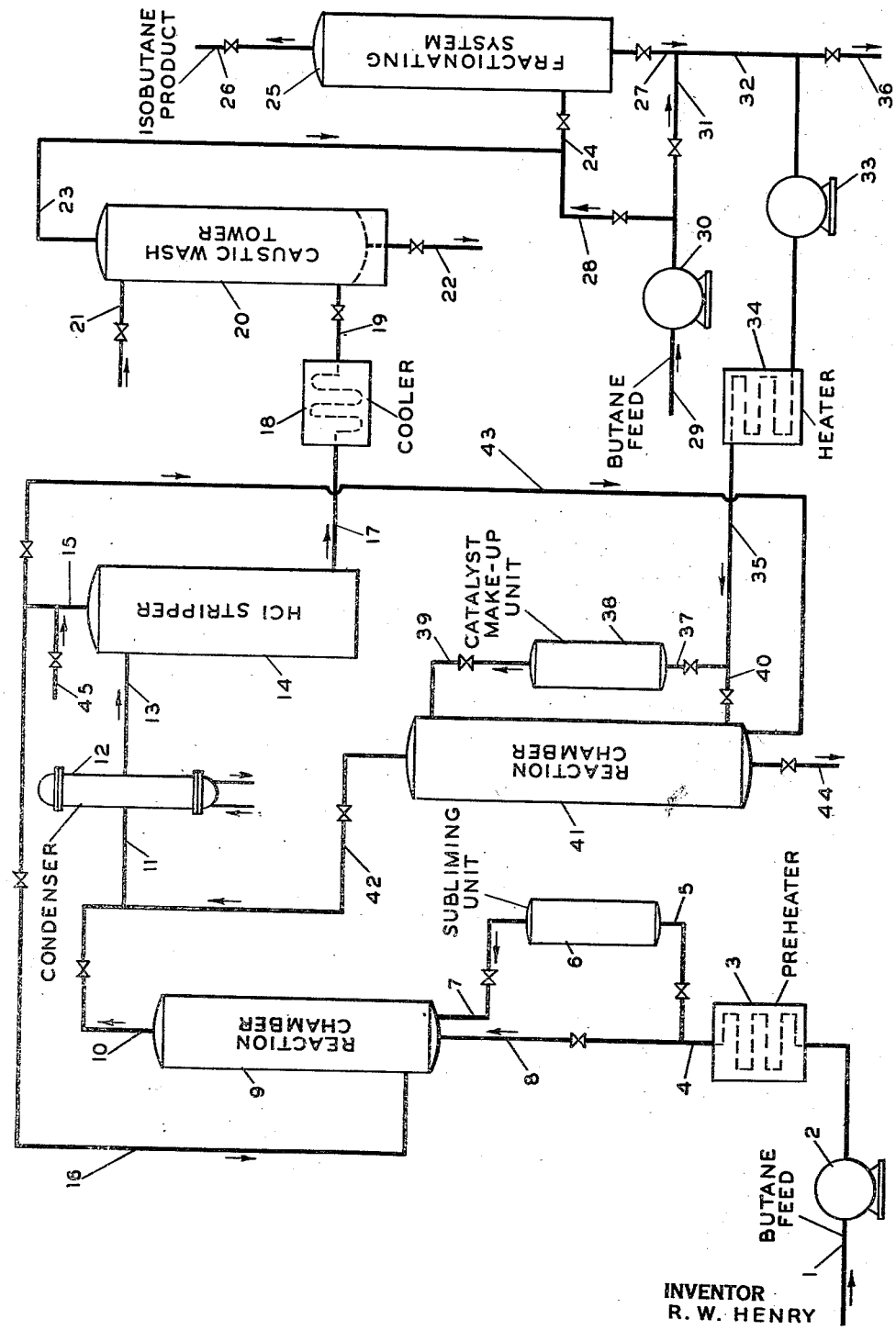

2,411,211

UNITED STATES PATENT OFFICE 2,411,211

ISOMERIZATION PROCESS

Robert W. Henry, Bartlesville, Okla., assignor to Phillips Petroleum Company, a corporation of Delaware Application October 6, 1944, Serial No. 557,435

7 Claims. (Cl. 260—683.5)

This invention relates to the isomerization of hydrocarbons. More particularly this invention relates to isomerization of low-boiling saturated hydrocarbons by conversion under two different sets of conditions. In one embodiment, the present invention relates to the isomerization of a butane, generally normal butane, in a two step process in which butane is first converted in the vapor phase and subsequently the unconverted butane therefrom is converted in the liquid phase.

The catalytic isomerization of saturated hydrocarbons, particularly the conversion of normal butane to isobutane, has become an important industrial process. Generally used is a Friedel-Crafts type metal halide catalyst, particularly one of the aluminum halides such as aluminum chloride, or bromide, activated with the corresponding hydrogen halide or a substance such as water or alkyl halide which affords the hydrogen halide under reaction conditions. Numerous methods for carrying out the reaction have been proposed, but each type of process has its limitations as well as its advantages.

There are essentially three types of isomerization processes; vapor phase, liquid phase and mixed phase. While various catalysts may be used for each type of process, preferred operations for each type include the use of a particular type of catalyst, different in each case, which gives optimum performance for that particular type of process. In the vapor phase process the isomerization takes place in a catalytic reaction chamber wherein the hydrocarbon feed stock is in the vapor phase. The catalyst preferably used in this vapor phase process comprises an effective amount of an anhydrous metal halide of the Friedel-Crafts type in combination with a solid adsorptive support. The essential element of the vapor phase process is the form of the catalyst, and whether the reactants are actually in the vapor phase, or in the liquid phase, or both, is not considered to be controlling. However, in the practice with this type of catalyst, the reactants are most frequently in the vapor phase; thus, the name vapor phase has been applied to the process. On the other hand, the liquid phase process comprises contacting the catalyst with the saturated hydrocarbon feed stock in the liquid phase with a liquid metal halide-hydrocarbon complex. The mixed phase process is carried out under boiling conditions of the hydrocarbon feed stock so that isomerization occurs while the hydrocarbons are in both the liquid and vapor phase. The catalyst used in the mixed phase processes preferably comprises a solid, relatively nonadsorptive catalyst together with an appreciable, but variable, amount of a liquid hydrocarbon Friedel-Crafts metal halide complex having some free metal halide therein. The characteristic of the liquid complex catalysts is that they are fluid and flow either concurrently or countercurrently to the flow of the liquid hydrocarbon feed in the reaction chamber.

The vapor phase process for the isomerization of normal butane has the advantages of high conversion and minimum operating difficulties, when properly conducted, but has the disadvantage of being quite susceptible to rapid and complete poisoning of the catalyst by high-boiling hydrocarbons, olefinic hydrocarbons, and non-hydrocarbon impurities such as oxygen- or sulfur-containing compounds. The liquid phase and mixed phase processes for the isomerization of normal butane, although not as high in conversion efficiency as the vapor phase process, are less susceptible to being completely poisoned by such impurities, apparently as a result of the presence of a liquid hydrocarbon-metal halide complex in each case.

An important object of this invention is to minimize or entirely avoid the poisoning of catalysts comprising aluminum chloride or other Friedel-Crafts type metal halide isomerization catalysts which are supported on adsorptive supports, such as "Porocel" (an iron-free, adsorptive, hard bauxite), especially when used to isomerize normal butane in the vapor phase, by pentanes and/or heavier hydrocarbons present in the recycle normal butane stream of an isomerization process.

Another object is to combine the vapor phase and the mixed or liquid phase isomerization processes in a novel manner in which advantages of each are retained while at the same time minimizing the disadvantages of each.

Other objects will become obvious to one skilled in the art from the disclosure and discussion.

It has been found that in the operation of the vapor phase butane isomerization process, particularly when supported aluminum chloride catalysts are used, even very small amounts of pentanes and heavier hydrocarbons in the feed cause rapid and complete poisoning of the catalyst. As little as 0.5 mol per cent pentanes or heavier is undesirable, in decreasing catalyst life, and amounts of the order of 1 or 2 mol per cent or higher usually cause a complete poisoning of the catalyst in a relatively short time.

In the normal operation of the vapor phase process the effluent from the catalyst chamber is fractionated to recover hydrogen chloride or other activator for recycle to the catalyst, isobutane produced by the reaction, and unconverted normal butane for recycle to the reaction zone. As the result of side reactions, some pentanes and heavier are formed and are present in the effluent to an extent of about 1 to 5 percent, and these generally are separated along with the normal butane, as a kettle product, and consequently are incorporated in the recycle stream. The result is the buildup of pentanes or heavier in the recycle, with the resulting poisoning of the catalyst. Fractionation of the total recycle stream is expensive and ordinarily uneconomical, and fractionating a portion to keep the pentanes or heavier to a given maximum still allows some of the pentanes or heavier to remain in the recycle.

It has also been found that the liquid phase and the mixed phase isomerization processes can tolerate pentanes or heavier more readily than can the vapor phase process; while pentanes or heavier usually increase catalyst consumption, they do not kill the catalyst so that the entire catalyst must be replaced, as is the case with the vapor phase process.

A system for isomerization has now been devised which combines the vapor phase process with the liquid or mixed phase process to give a process having very high conversion and a greatly increased life of the catalyst. In accordance with this invention, a feed of normal butane as pure as possible, preferably completely free from olefins, water and oxygen- and sulfur-containing compounds and containing less than 0.5 mol per cent of pentanes and heavier, is passed to a vapor phase isomerization step, preferably one employing aluminum chloride supported on activated bauxite ("Porocel") in the presence of hydrogen chloride, and the effluent is fractionated to recover an isobutane fraction and an unconverted normal butane fraction. This normal butane fraction, which contains appreciable amounts of pentanes and perhaps heavier hydrocarbons, rather than being returned to the vapor phase step is passed to a liquid phase or mixed phase isomerization step. The liquid phase (or mixed phase) step preferably is of the type in which aluminum chloride is carried into the reaction chamber continuously or intermittently to maintain catalyst activity, and the reactants are contacted in the chamber with a sludge or other type of aluminum chloride catalyst which is present in limited amounts and which is regularly fortified as described, with spent or partially spent catalyst being regularly withdrawn.

The effluent from the liquid or mixed phase step may be treated in any desired manner for recovery of the isobutane product and recycle stocks. It may advantageously be fractionated along with the vapor phase step effluent. If desired a part of the recycle may be fractionated to prevent too high a buildup of pentanes or heavier. However, this is not obligatory for a constant pentane or heavier content will be reached in steady state operations so that excess pentanes or heavier produced will disappear in side reactions such as cracking to isobutane and/or sludge formation, and it is a feature of this invention that such fractionation may be completely omitted.

The drawing illustrates diagrammatically one application of the present invention. Where it is desired to produce isobutane by isomerization of a butane feed, the first step in the present process is a conversion of the butane feed in the presence of an absorptive catalyst impregnated with a Friedel-Crafts metal halide similar to those used in a vapor phase isomerization process. A purified feed comprising normal butane, with not more than 0.5 mol per cent pentanes or heavier, is conveyed through line 1 by pump 2 to preheater 3 where the feed is vaporized. The vaporized feed at a temperature of about 225 to about 325° F. passes from preheater 3 through line 4, and may divide into two streams; one stream passing through line 5 and the other stream passing through line 8. That portion of the feed from line 5 enters catalyst make-up tank 6 where it sublimes the aluminum halide catalyst contained therein. This sublimed catalyst and vaporized feed pass through line 7 into reaction chamber 9. The other portion of the vapor feed from line 4 passes directly to the reaction chamber 9 through line 8. Hydrogen chloride, which has a beneficial effect on the life and activity of the catalyst when present in the concentration of about 2 to about 5 mol per cent of incoming feed, enters reaction chamber 9 through line 16. A pressure of about 200 to about 300 pounds per square inch gage is maintained in the reaction chamber. Although conversion is not very sensitive to the velocity within the chamber, a space velocity less than one liquid volume of feed per volume of catalyst per hour is most desirable. The reaction chamber 9 is packed with an absorptive catalyst such as "Porocel" (2 to 20 mesh) impregnated with a Friedel-Crafts metal halide. The vapor effluents from reaction chamber 9 pass through lines 10 and 11 to condenser 12 and from condenser 12 by line 13 to the top of hydrogen chloride removal tower or stripper 14. The hydrogen chloride fraction leaves the top of the stripper 14 at a temperature of 100° F. to 140° F. and is recirculated to the reaction chamber 9 through conduits 15 and 16. The stripped bottoms from tower 14, free from hydrogen chloride, pass at a temperature of about 225° F. to 245° F. through line 17 to cooler 18, and then pass by line 19 to caustic treating tower 20 where any traces of residual hydrogen chloride or entrained metal halide catalyst are neutralized. The caustic solution enters through line 21 and the acid salt and excess caustic solution is removed from the bottom of tower 20 by line 22. From the caustic treating tower 20 the unconverted butane and conversion products are conveyed through lines 23 and 24 to a fractionating system represented by tower 25. The fractionation of isobutane from normal butane and heavier materials is carried out in the conventional manner. The isobutane product is withdrawn through line 26. The bottom fraction containing normal butane and heavier from the fractionation tower 25 is withdrawn through line 27 as the feed to be charged to the second step of the present process.

This first step of the process is applied to a substantially pure normal butane fraction containing not more than one mol per cent of pentanes or heavier and preferably appreciably less than 0.5 mol per cent.

The catalyst used in the execution of the first step of this invention comprises a solid adsorptive inorganic material which has been partially dehydrated by heating it to a temperature greater than 400° F. but not sufficiently high to drive off all of the water contained therein, or to effect an adverse change in the crystal structure. An essential constituent of the catalyst mass is a solid adsorptive inorganic material. Since the catalyst is subjected to a dehydration treatment prior to its use, it will not suffer any further substantial dehydration and retains its character as a partially but not completely dehydrated solid inorganic adsorptive material when used in the isomerization process.

Among the solid inorganic compounds suitable in the first step of this process by virtue of the fact that they are good adsorptive materials are the mineral or mineral like compounds, preferably nearly completely dehydrated, such as the kaolinites, Terrana (a commerical alumina clay), Floridin (a commercial fuller's earth), pyrophyllite, apophyllite, meerschaum, serpentine, kieserite, bentonite, talc, bauxite, the permutites, the zeolites and the like as well as the prepared hydrated materials such as the prepared permutites and zeolites, aluminum oxides, magnesium oxides, silica, and similar compounds prepared by partial dehydration of the hydroxides and the like.

The adsorptive materials of the above are employed in admixture or in combination with an active metal halide isomerization catalyst of the Friedel-Crafts or aluminum halide type. Preferred catalysts are those comprising aluminum chloride and aluminum bromide.

This supported aluminum halide catalyst may be used mixed with or supported on other materials which may or may not have a catalytic effect on the isomerization reaction. Suitable inert materials with which the catalyst can be mixed or supported upon are chamotte, quartz, intensively calcined clays, and completely dehydrated alumina.

The catalytic material in any suitable solid form as powder, pillules, pellets, or granules of the desired size is employed in manners customary in the execution of catalytic processes of this type. The desired quantity of the granular catalyst material may be packed or otherwise contained in a reaction tube, chamber or tower and maintained at the desired temperature by suitable heating and/or cooling means while the material to be treated is passed into contact with it under the appropriate pressure for the required period of time.

The first step of this process is executed at a temperature not greater than about 400° F. and preferably at temperatures below 325° F. At temperatures above 400° F. losses of material due to undesirable cracking reactions are prohibitive. The lower limit of temperature range is set by that temperature at which the desired isomerization will take place at a practical rate. Temperatures as low as about 125° F. may be used in some cases. A preferred practical operating range is from about 150° F. to about 325° F.

Unless fairly high pressures are used, the catalyst may suffer loss of activity because of the sublimation of the metal halide therefrom or because of further dehydration of the partially dehydrated catalyst mass. Thus, it is preferred to use pressures from 200 to 400 pounds per square inch gage. In practice the temperature and pressure are adjusted so that the first step of this invention is carried out in the vapor phase. It may also be carried out in the liquid phase if desired. If the reaction is effected under moderately superatmospheric pressures of from about 100 to about 450 pounds per square inch gage, practicable conversion of normal butane to isobutane can be effected at relatively lower temperatures than when the process is executed at atmospheric or lower pressures. Consequently, by operation at superatmospheric pressures, excellent conversion can be obtained at temperatures so low that side reactions and sublimation of the metal halide from the catalyst mass are substantially eliminated.

The presence in the reaction system in the first step of a hydrogen halide or substance capable of yielding a hydrogen halide under the conditions existing in the reaction system appears to have a beneficial effect upon the life and activity of the metal halide-containing catalyst, particularly those containing an aluminum halide. In many cases it is beneficial to the reaction to have relatively small amounts of hydrogen chloride added to the reactants and present during the reaction. As a substance capable of yielding a hydrogen halide, tertiary butyl chloride and the like halides which will decompose under reaction conditions to yield the hydrogen halide, may be added to the system. The amount of hydrogen halide within the reaction zone at any time should not be more than 10 mol per cent for best results.

The most suitable contact time will depend upon the particular catalyst, upon the reaction conditions, and upon the feed used. The contact time is chosen so that a practicable conversion is obtained with the minimum side reactions. In isomerization of normal butane in the first step in the vapor phase at temperatures between 150° F. and 325° F., contact times from about 20 to about 200 seconds are used.

The catalyst in the first step of the process of this invention, after it has suffered substantial deactivation because of use in the process, can be restored to its initial activity by addition, at a temperature not greater than about 400° F., of an aluminum halide. The reactivation can be effected without removing the catalyst from the reaction chamber, while the catalyst is functioning, but preferably after the catalyst has temporarily been taken out of use. In previous normal use, the supported aluminum halide catalyst has a very short life because of its susceptibility to poisoning by high-boiling hydrocarbons, olefins, and non-hydrocarbon impurities such as oxygen- or sulfur-containing compounds. Especially in the case of high-boiling hydrocarbons which are built up in the system by recycling or recirculating the effluent from the reaction chamber, the catalyst is permanently deactivated. However, in operating in the process of the present invention there is no recycle or recirculation of the effluents from the reaction chamber, but instead these effluents are sent to the second step of the process to be further converted by a catalyst less susceptible to poisoning by high-boiling hydrocarbons. The advantage of using these adsorptive catalysts in the first step is the very high conversion per pass obtained under the appropriate operating conditions. Further conversion of the remaining unconverted butanes is carried out in the second step of the process without eliminating the high-boiling hydrocarbons and other impurities. The catalyst used in the second step is less susceptible to poisoning by impurities and high-boiling hydrocarbons, but often does not give quite as good conversion per pass as the catalyst used in the first step. Nevertheless, the combination of the two types of catalyst in the manner disclosed by this invention increases the overall conversion and also substantially increases the catalyst life.

After the normal butane has undergone conversion to isobutane in the first step, the unconverted butanes are separated as an unconverted butane residual fraction having more than 0.5 mol per cent pentanes or heavier therein and introduced into another reaction chamber to be converted with a liquid complex or sludge type catalyst. The conversion of the butanes in either the liquid or mixed phase constitutes the second step of the present process. In one application of this invention the second step involves the conversion of the butanes in a mixed vapor-liquid phase which essentially comprises converting the butanes under boiling conditions using a hydrocarbon-aluminum halide complex or sludge type catalyst.

The separated normal butane fraction from fractionating system 25 passes to heater 34 through lines 27 and 32 by means of pump 33. Additional butane feed may enter the second step of the process from line 29 and pump 30 by passing either through line 28, line 24 and the fractionating system 25 or directly through line 31. The combined feed passes through heater 34 where it is brought to the desired temperature, generally within the range of 200° F. to 250° F., although isomerization temperatures outside this range may also be used. The heated feed, now partly or entirely vaporized, but in any case near its dew point, is introduced by lines 35 and 40 into the bottom of reaction chamber 41 through a distributing spider (not shown) for passage upward into a column containing boiling hydrocarbons and catalyst. Hydrogen chloride is added through line 43. The conditions of temperature and pressure within the reaction chamber 41 are so controlled that the liquid hydrocarbons therein are always boiling. The pressure within the reaction chamber is usually within the range of 250 to 350 pounds per square inch gage.

Line 36 may be used to withdraw a portion of the unconverted butanes fraction for further fractionation or treatment.

A small portion of the feed butane may be by-passed through line 37 into an aluminum halide saturator 38 and conducted from the saturator 38 through line 39 to the top of the reaction chamber 41. This by-pass stream of hydrocarbons dissolves aluminum halide from the saturator 38 and carries the same into the top of the reactor to provide continuously a fresh catalyst make-up. Saturator 38 is periodically charged with aluminum halide to replenish the catalyst available to the system. It is preferred that the by-pass stream be free of hydrogen chloride before it enters saturator 38, therefore, a portion of the feed stream is passed to the saturator 38 before introducing the hydrogen chloride into the feed. The reaction chamber 41 is packed with Raschig rings or the like. A hydrocarbon-aluminum halide sludge having some free aluminum halide therein is formed in chamber 41 and slowly flows down over the packings in the chamber countercurrently to the ascending stream of vapors and liquid. The sludge catalyst becomes more and more spent as it approaches the bottom of the reaction chamber.

A certain level of catalyst sludge may be maintained at the bottom of the chamber 41 and the remainder of the spent sludge and high-boiling hydrocarbons are withdrawn through line 44. This bed of sludge at the bottom of the reaction chamber serves to effect a final and more complete spending of the catalyst activity of the sludge, and also serves to partially remove any catalyst poisons, such as carbon monoxide, water, organic sulfur compounds and/or hydrogen sulfide, which may be in the feed stream bubbling through the sludge bed.

The chamber 41 is substantially filled with liquid butanes which are boiling and sending vapors up the tower through the liquid and contact material. The reaction is believed to take place mostly in the liquid phase, although there is also some conversion in the vapor phase.

The effluent comprising for the most part isobutane, unconverted butane, and hydrogen chloride, together with a small amount of heavier hydrocarbons, leaves chamber 41 by line 42 and is introduced into line 11 for removal of hydrogen chloride and separation of isobutane. Both the first and second steps may utilize the same apparatus for removal of hydrogen chloride and recovery of the isobutane product. In this respect, the effluents from chamber 41 may be conducted to condenser 12 and thence to hydrogen chloride stripper 14 by line 13. The stripped hydrogen chloride is returned to the reaction chambers of both the first and second step by lines 15, 16 and 43. Make-up hydrogen chloride enters the system through line 45.

From the foregoing description it will be seen that the reaction chamber of the second step contains a body of liquid through which vapors, introduced at the bottom and formed in the chamber, are continuously bubbling. The vapors and liquid are at all points in equilibrium, with condensation and revaporization occurring. Too low a bottom feed rate reduced the percentage conversion resulting probably from inadequate agitation and sludge hold-up. A rapid up-flow of vapors through the packing aids materially in holding catalyst sludge to a slow rate of run-down, thus assuring the maximum utilization of catalytic activity. In the case of a column packed with ¾ inch to one inch Raschig rings, a bottom feed rate is maintained which would produce, if the column were free from liquid, a linear vapor velocity of at least 0.1 foot per second and preferably as high as 0.2 feet per second.

The reaction chamber of the second step of the present invention is packed with a solid catalyst supporting material or carrier agent, such as carbon Raschig rings, of such a nature as to have a high wetability by the catalyst sludge. The high wetability of the supporting material assures a large hold-up of the catalyst sludge. This packing material is ordinarily relatively inert with respect to reactants and catalyst. Examples are Raschig rings, Berl saddles, etc., made from carbon, glazed or unglazed porcelain or other ceramic ware. Other types of packing which may be used include bauxite, Activated Alumina, fuller's earth, silica gel which may have adsorptive properties enhancing the activity of the sludge catalyst.

The catalyst employed in this second step comprises essentially a Friedel-Crafts metal halide which will form a sludge complex with the butane feed. This hydrocarbon-metal halide complex having some free metal halide therein is a very active catalyst and has the advantage of not being very susceptible to permanent poisoning by high-boiling hydrocarbons, olefins, and non-hydrocarbon impurities such as oxygen- or sulfur-containing compounds. The spent sludge may be withdrawn from the reaction chamber and disposed of since it is relatively cheap, or it may be regenerated for reuse.

The presence in the reaction system of the second step of a hydrogen halide appears to have a beneficial effect upon the life and activity of the catalyst. It is, therefore, beneficial to the reaction to have relatively small amounts of hydrogen chloride added to the reactants and present during the reaction.

The pressure of the reaction chamber in the second step is maintained so as to keep the butanes in the liquid phase in the chamber at the isomerization temperatures, and so as to release vapors from the top substantially at their dew point. Preferred pressures are from about 200 to about 450 pounds per square inch gage. The reaction temperatures for the second step are somewhat lower than those temperatures used in the first or vapor phase step of this invention. In general, it is desired to carry out the second step in the liquid phase which necessitates lower temperatures and higher pressures than if carried out in the vapor phase. The reaction temperatures may range from about 100° F. to about 300° F., and preferably from 200° F. to 250° F.

Preferably, the feed to the second step should have a relatively narrow boiling range, comprising substantially normal butane, and contains a minimum amount of unsaturates and aromatics. The feed may contain some pentanes or heavier without materially affecting the conversion process. If new feed is to be added between the first and second step, it is preferred to introduce this new feed into the process just prior to the fractionating system in order to obtain a relatively pure butane feed.

The contact time of the feed with the catalyst for the second step may vary within a relatively large range without affecting the conversion process. Contact times from about 2 to about 20 minutes are most desirable.

Although the invention has been described with particular reference to a specific conversion carried out in a specific and preferred manner, various modifications will occur to one skilled in the art which may be practiced without departing from the scope of the invention. This application is a continuation-in-part of my copending application Serial No. 513,263, filed December 7, 1943, issued December 26, 1944, Patent No. 2,366,028.

I claim:

1. The continuous process for the isomerization of normal butane to isobutane in the presence of an aluminum chloride catalyst, which comprises vaporizing a butane hydrocarbon fraction having less than 0.5 mol per cent pentanes or heavier hydrocarbons therein and essentially free from unsaturated hydrocarbons and non-hydrocarbon impurities, contacting the vaporized butane hydrocarbon fraction with a solid catalyst essentially comprising an effective amount of aluminum chloride in combination with a solid granular adsorptive material in a reaction zone under isomerization conditions, maintaining a temperature of reaction between about 150° F. and about 325° F. and a pressure between about 200 and about 400 pounds per square inch gage, introducing a small amount of hydrogen chloride with said vaporized butane hydrocarbon fraction prior to contacting said catalyst, passing an effluent from said reaction zone to a fractionating means for the separation of hydrogen chloride and isobutane therefrom, recovering hydrogen chloride from said fractionating means and recycling a portion of said hydrogen chloride to a vaporized butane hydrocarbon fraction, and recovering further from said fractionating means isobutane as a product of the process; subsequently contacting a liquid unconverted butane hydrocarbon residual fraction having more than 0.5 mol per cent pentanes or heavier hydrocarbons therein withdrawn from said fractionating means with a liquid catalyst comprising an aluminum chloride-hydrocarbon complex together with free aluminum chloride in a reaction zone containing contact material of high wetability by said liquid catalyst under isomerization conditions, maintaining a temperature of reaction between about 100° F. and about 300° F. and a pressure sufficiently high to maintain said unconverted butane hydrocarbon residual fraction in the liquid phase, introducing a small amount of hydrogen chloride with said unconverted butane hydrocarbon residual fraction prior to contacting with said liquid catalyst, dissolving aluminum chloride in a by-passed portion of said unconverted butane hydrocarbon residual fraction and introducing said by-passed fraction containing said dissolved aluminum chloride into the last said reaction zone, passing an effluent from the last said reaction zone to the aforesaid fractionating means together with said effluent from the first said reaction zone for the separation of hydrogen chloride and isobutane therefrom, and recycling a portion of said hydrogen chloride to a liquid unconverted butane residual fraction.

2. A process according to claim 1 in which pressure of the second isomerization step is the vapor pressure of the reaction mixture at the temperature of reaction.

3. The continuous process for the isomerization of normal butane to isobutane in the presence of a Friedel-Crafts metal halide catalyst, which comprises vaporizing a butane hydrocarbon fraction having less than 0.5 mol per cent pentanes or heavier hydrocarbons therein and essentially free from unsaturated hydrocarbons and non-hydrocarbon impurities, contacting the vaporized butane hydrocarbon fraction with a solid catalyst essentially comprising an effective amount of a Friedel-Crafts metal halide in combination with a solid granular adsorptive material in a reaction zone under isomerization conditions and in the presence of a hydrogen halide, maintaining a temperature of reaction between about 150° F. and about 325° F. and a pressure between about 200 and about 400 pounds per square inch gage, passing an effluent from said reaction zone to a fractionating means for the separation of isobutane therefrom, and recovering from said fractionating means isobutane as a product of the process; subsequently contacting a liquid unconverted butane hydrocarbon residual fraction having more than 0.5 mol per cent pentanes or heavier hydrocarbons therein withdrawn from said fractionating means with a liquid catalyst comprising a Friedel-Crafts metal halide-hydrocarbon complex together with free Friedel-Crafts metal halide in a reaction zone under isomerization conditions and in the presence of a hydrogen halide, maintaining a temperature of reaction between about 100° F. and about 300° F. and a pressure sufficiently high to maintain said unconverted butane hydrocarbon residual fraction in the liquid phase, and passing an effluent from the last said reaction zone to the aforesaid fractionating means together with said effluent from the first said reaction zone for the separation of isobutane therefrom.

4. An improved process for the conversion of normal butane to isobutane in the presence of an aluminum chloride catalyst, which comprises contacting a normal butane hydrocarbon fraction in the vapor phase containing not more than 0.5 mol per cent of hydrocarbons heavier than normal butane and essentially free from unsaturated hydrocarbons and non-hydrocarbon impurities with a solid granular isomerization catalyst comprising aluminum chloride adsorbed upon a solid granular adsorptive material under vapor phase isomerization reaction conditions and in the presence of a minor amount of hydrogen chloride to produce isobutane, passing effluents of said isomerization to a fractionating means, recovering from said fractionating means an isobutane fraction as a product of the process, recovering further from said fractionating means as a high-boiling residual fraction a normal butane fraction containing more than 0.5 mol per cent of heavier hydrocarbons, contacting the last said normal butane fraction in the liquid phase with an isomerization catalyst comprising an aluminum chloride-hydrocarbon complex together with free aluminum chloride under liquid phase isomerization conditions and in the presence of a minor amount of hydrogen chloride to produce isobutane, and recovering from effluents of the last said isomerization step an isobutane fraction so produced as a product of the process.

5. The process of claim 4 in which effluents of the second said isomerization step are passed to said fractionating means together with effluents of first said isomerization step.

6. The continuous process for the isomerization of normal butane to isobutane in the presence of a Friedel-Crafts metal halide catalyst, which comprises vaporizing a butane-hydrocarbon fraction having less than 0.5 mol per cent pentanes or heavier hydrocarbon therein and essentially free from unsaturated hydrocarbons and non-hydrocarbon impurities, contacting the vaporized butane-hydrocarbon fraction with a solid catalyst essentially comprising an effective amount of a Friedel-Crafts metal halide in combination with a solid granular adsorptive material in a first reaction zone under vapor phase isomerization conditions, passing an effluent from said reaction zone to a fractionating means for the separation of isobutane therefrom, and recovering from said fractionating means isobutane as a product of the process; subsequently contacting a liquid residual fraction of unconverted butane having more than 0.5 mol per cent pentanes or heavier hydrocarbons therein withdrawn from said fractionating means with a liquid catalyst comprising a Friedel-Crafts metal halide-hydrocarbon complex in a second reaction zone under liquid phase isomerization conditions, and passing an effluent from said second reaction zone to the aforesaid fractionating means together with said effluent from said first reaction zone for the separation of isobutane therefrom as a product of the process.

7. The continuous process for the isomerization of normal butane to isobutane in the presence of a Friedel-Crafts metal halide catalyst, which comprises vaporizing a butane hydrocarbon fraction having less than 0.5 mol per cent pentanes or heavier hydrocarbons therein and essentially free from unsaturated hydrocarbons and non-hydrocarbon impurities, contacting the vaporized butane hydrocarbon fraction with a solid catalyst essentially comprising an effective amount of a Friedel-Crafts metal halide in combination with a solid granular adsorptive material in a first reaction zone under isomerization conditions and in the presence of a hydrogen halide, maintaining a temperature of reaction between about 150° F. and about 325° F. and a pressure between about 200 and about 400 pounds per square inch gage, removing an effluent from said first reaction zone, liquefying at least a portion of said effluent from said first reaction zone, subsequently contacting said liquefied effluent containing unconverted normal butane and more than 0.5 mol per cent pentanes or heavier hydrocarbons therein with a liquid catalyst comprising a Friedel-Crafts metal halide-hydrocarbon complex together with free Friedel-Crafts metal halide in a second reaction zone under isomerization conditions and in the presence of a hydrogen halide, maintaining a temperature of reaction between about 100° F. and about 300° F. and a pressure sufficiently high to maintain said unconverted butane-containing fraction in the liquid phase, recovering an effluent from said second reaction zone, and recovering isobutane from the last said effluent as a product of the process.

ROBERT W. HENRY.